US008713052B2

(12) United States Patent
Goto

(10) Patent No.: US 8,713,052 B2
(45) Date of Patent: Apr. 29, 2014

(54) FILE MANAGEMENT APPARATUS AND FILE MANAGEMENT APPARATUS CONTROLLING METHOD

(75) Inventor: Satoru Goto, Nagoya (JP)

(73) Assignee: Buffalo Inc., Nagoya-shi (JP)

( * ) Notice: Subject to any disclaimer, the term of this patent is extended or adjusted under 35 U.S.C. 154(b) by 30 days.

(21) Appl. No.: 13/473,122

(22) Filed: May 16, 2012

(65) Prior Publication Data

US 2012/0296949 A1    Nov. 22, 2012

(30) Foreign Application Priority Data

May 19, 2011    (JP) ................................ 2011-112921

(51) Int. Cl.
*G06F 17/30*    (2006.01)
(52) U.S. Cl.
USPC ......................................................... 707/781
(58) Field of Classification Search
USPC .................. 707/781–782, 787–788
See application file for complete search history.

(56) References Cited

U.S. PATENT DOCUMENTS

| 2002/0174208 | A1* | 11/2002 | Morlitz | ......................... 709/223 |
| 2003/0093614 | A1* | 5/2003 | Kohn et al. | ................... 711/105 |
| 2012/0014332 | A1* | 1/2012 | Smith et al. | ................... 370/329 |

FOREIGN PATENT DOCUMENTS

| JP | 2008-124662 | 5/2008 |
| JP | 2010-287104 | 12/2010 |

* cited by examiner

*Primary Examiner* — Thu-Nguyet Le
(74) *Attorney, Agent, or Firm* — Oblon, Spivak, McClelland, Maier & Neustadt, L.L.P.

(57) ABSTRACT

A file management apparatus that communicates with an online storage subject to use constraints. The file management apparatus including a processor that controls at least one of two access processes, one of the two access processes being an upload to the online storage, the other access process being a download from the online storage, and performs access inhibit control to inhibit the access processes to meet the use constraints based on at least one of a number of times access is made to the online storage per unit time and an amount of data communicated with the online storage per unit time.

9 Claims, 6 Drawing Sheets

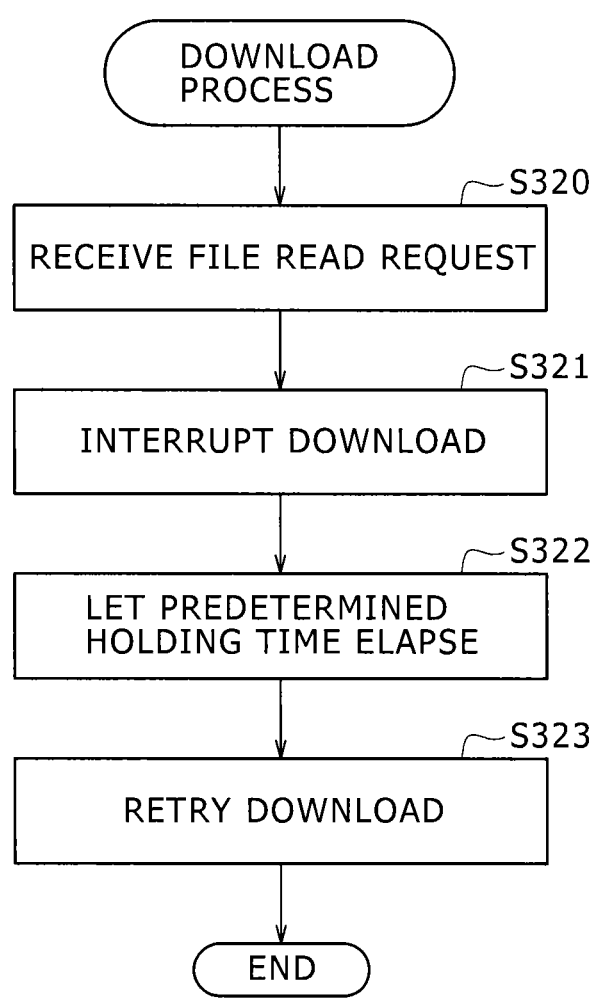

FILE MANAGEMENT APPARATUS AND FILE MANAGEMENT APPARATUS CONTROLLING METHOD

CROSS-REFERENCE TO RELATED APPLICATION

This non-provisional application claims priority under 35 U.S.C. §119(a) to Japanese Patent Application No. 2011-112921 filed on May 19, 2011, the entire contents of which are hereby incorporated by reference.

BACKGROUND OF THE DISCLOSURE

1. Field of the Disclosure

The present disclosure relates to a file management apparatus and a file management apparatus controlling method compatible with online storage services.

2. Description of the Related Art

There exist local storage arrangements such as storage devices incorporated in users' terminals (called "user terminal" hereunder) and external storage devices to be connected to the user terminal, the devices being configured to store various files.

Progress in communication technology in recent years has given birth to online services (Web services) offering to store files in an online storage on the Internet. With such services, the user terminal uploads and downloads files to and from the online storage.

In order to enhance the availability of such online storage, there has been proposed a file management apparatus (see Japanese Patent Laid-open No. 2010-287104) offering an experience in which a user is led to utilize an online storage without becoming aware of it.

The file management apparatus proposed in the above-cited Japanese Patent Laid-open No. 2010-287104 includes an application for automatically uploading the files held in the apparatus to an online storage. The proposed apparatus presents the user with a display of virtual files indicating as if the files are held inside the apparatus although they are actually in the online storage.

Meanwhile, some online storage providers impose constraints on the use of their services so that some unscrupulous users will not abuse or monopolize service offerings.

As a result, with the type of file management apparatus disclosed notably in Japanese Patent Laid-open No. 2010-287104 in which an online storage is handled as a local storage, the use constraints imposed by the provider may disable attempts to access the online storage, thus making it impossible to read or write files.

The present disclosure has been made in view of the above circumstances and provides a file management apparatus and a file management apparatus controlling method for suitably reading and writing files even where the use of an online storage is subject to constraints imposed by the service provider.

SUMMARY OF THE DISCLOSURE

According to one aspect of the present disclosure, there is provided a file management apparatus that communicates with an online storage subject to use constraints. The file management apparatus including a processor that controls at least one of two access processes, one of the two access processes being an upload to the online storage, the other access process being a download from the online storage, and performs access inhibit control to inhibit the access processes to meet the use constraints based on at least one of a number of times access is made to the online storage per unit time and an amount of data communicated with the online storage per unit time.

BRIEF DESCRIPTION OF THE DRAWINGS

Further objects and advantages of the present disclosure will become apparent upon a reading of the following description and appended drawings in which:

FIG. 7 is a flowchart of a download process performed in step S300 of FIG. 5 by the NAS according to an aspect of the disclosure.

DETAILED DESCRIPTION

One aspect of the present disclosure is described below in reference to the accompanying drawings. A NAS (Network Attached Storage), for example, may serve as a file management apparatus in an aspect of the present disclosure. Throughout the drawings referenced in the ensuing description, like or corresponding parts and components are designated by like or corresponding reference symbols.

(System Configuration)

Figure 1:
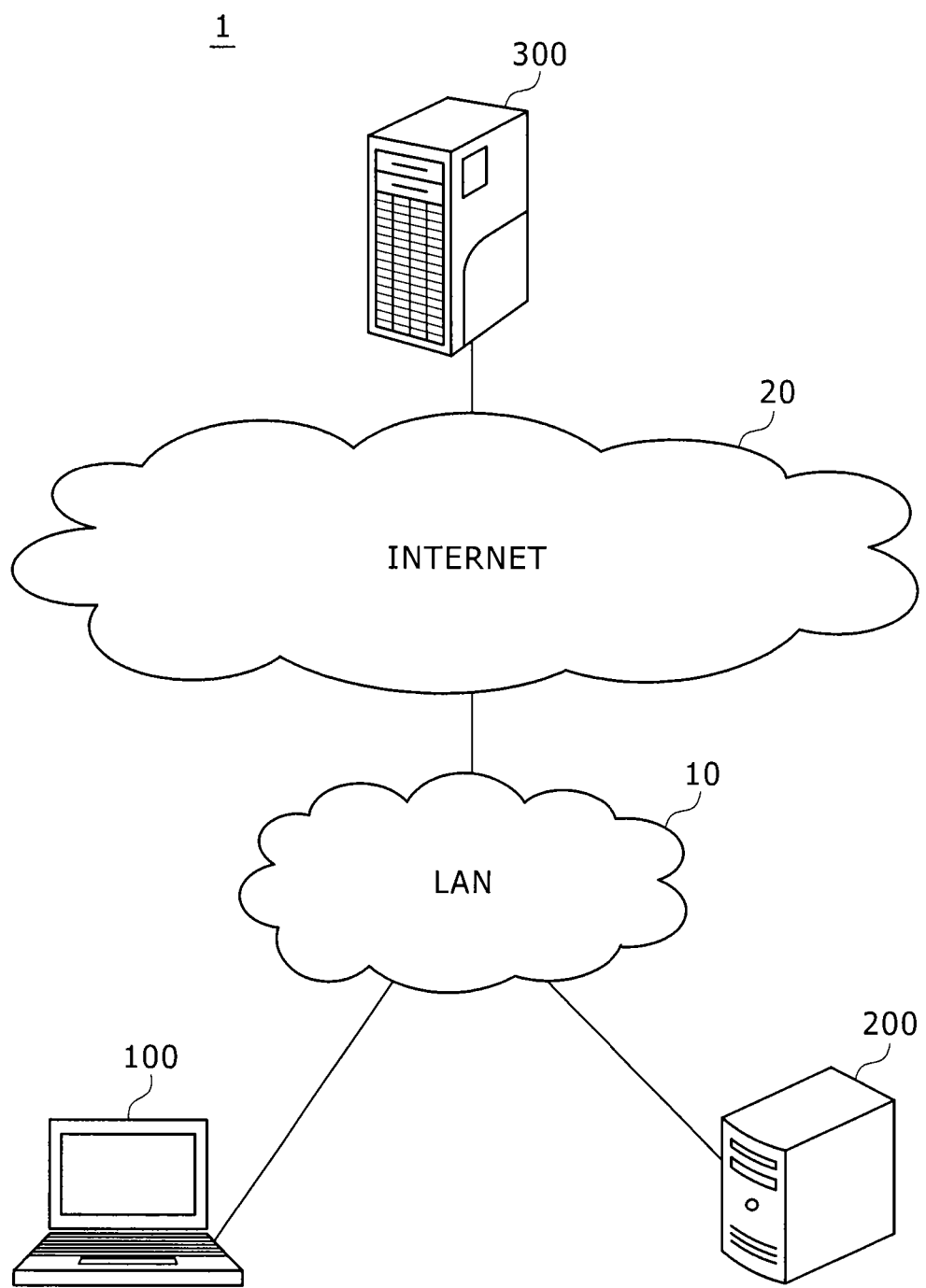
FIG. 1 is an overall configuration diagram of a communication system according to an aspect of the present disclosure.

An overall configuration of a communication system will now be explained. FIG. 1 is an overall configuration diagram of a communication system 1 according to an aspect of this disclosure.

As shown in FIG. 1, the communication system 1 has a PC 100, a NAS 200 and an online storage 300. In this aspect, the PC 100 corresponds to a user terminal. However, the user terminal is not limited to the PC 100; the user terminal may also be a mobile phone terminal, a network-ready TV set or the like.

The PC 100 and NAS 200 are connected to a LAN (Local Area Network) 10 such as a home network and communicate with each other via the LAN 10. The LAN 10 is connected to the Internet 20 via a router or the like. The online storage 300 is connected to the Internet 20.

The PC 100 is a common information processing apparatus operated by a user and furnished with a program control device such as a CPU, a storage part such as a memory, a user interface including a display, a keyboard, a mouse, etc., a network communication part for conducting network communications, and the like. The PC 100 stores and retrieves files to and from the NAS 200 via the LAN 10.

The NAS 200 is a file server customized to store and manage files. As such, the NAS 200 includes a program control device such as a CPU, a storage part such as a memory, a network communication part for conducting network communications, and a storage device. The CPU carries out processes (of a file system) for managing the files in the storage device. The NAS 200 may be shared by a plurality of user terminals.

The online storage 300 offers a Web service that stores and retrieves files, and is configured to include one or a plurality of file servers. For example, the online storage 300 offers a storage area that can be used by a user having registered with this Web service. For this aspect, the user of the PC 100 is assumed to have registered with the service offered by the online storage 300.

The online storage 300 is subject to use constraints imposed by the service provider. The use constraints may include at least either an upper limit on the number of times access is made per unit time or an upper limit on the amount of data communicated per unit time.

In the current context, the unit time means a predetermined time period such as one minute or one hour. The upper limit on the number of times access is made per unit time is up to, say, 300 times in one hour for example. The upper limit on the amount of data communicated per unit time is up to, say, 1 TB per hour for example. The number of times access is made to the online storage 300 corresponds to the number of times an API (Application Program Interface) of the online storage 300 is called by the NAS 200.

The paragraphs that follow explain a case in which the use constraints constitute an upper limit on the number of times access is made per unit time. Where the use constraints make up an upper limit on the amount of data communicated per unit time, the wording "number of times access is made" may be replaced with the wording "amount of data communicated" in the ensuing description.

(NAS Configuration)

Figure 2:
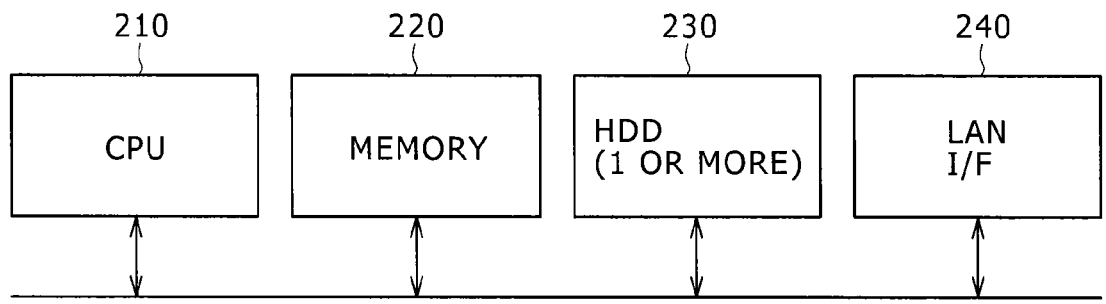
FIG. 2 is a hardware configuration diagram of a NAS (Network Attached Storage) according to an aspect of the disclosure.

The hardware configuration of the NAS 200 is explained first. FIG. 2 is a block diagram showing a typical hardware configuration of the NAS 200.

As shown in FIG. 2, the NAS 200 has a CPU (Central Processing Unit) 210, a memory 220, one or a plurality of HDDs (Hard Disk Drives) 230, and a LAN interface 240. The CPU 210, memory 220, HDDs 230, and LAN interface 240 are interconnected via a bus line.

The CPU 210 executes control programs (firmware, etc.) that are stored in the memory 220. The CPU 210 performs at least either of two access processes, one of the two processes being an upload to the online storage 300, the other access process being a download from the online storage 300. Also, the CPU 210 performs access inhibit control for inhibiting the access process to meet the use constraints of the online storage 300 based on at least either the number of times access is made per unit time or the amount of data communicated per unit time during the access process. Specific details of the processing by the CPU 210 will be discussed later.

The memory 220 is a flash memory, a RAM (Random Access Memory) or the like. The memory 220 stores the control programs to be executed by the CPU 210. Also, the memory 220 is used by the CPU 210 as a work area.

The memory 220 includes, for example, a cache area for temporarily caching the files to be uploaded to and the files downloaded from the online storage 300. The memory 220 also stores the substance of the use constraints of the online storage 300 (the upper limit on the number of times access is made per unit time, in this example).

The HDDs 230 store diverse files. The HDDs 230 may be configured to make up a disk array or a RAID (Redundant Arrays of Inexpensive Disks).

The LAN interface 240 is connected to the LAN 10 and configured to conduct communications via the LAN 10. The LAN interface 240 may be connected to the LAN 10 in a wired or wireless fashion. The LAN interface 240 receives from the PC 100 a storage target file, a file storage request, a file update request, a file read request, and the like.

Figure 3:
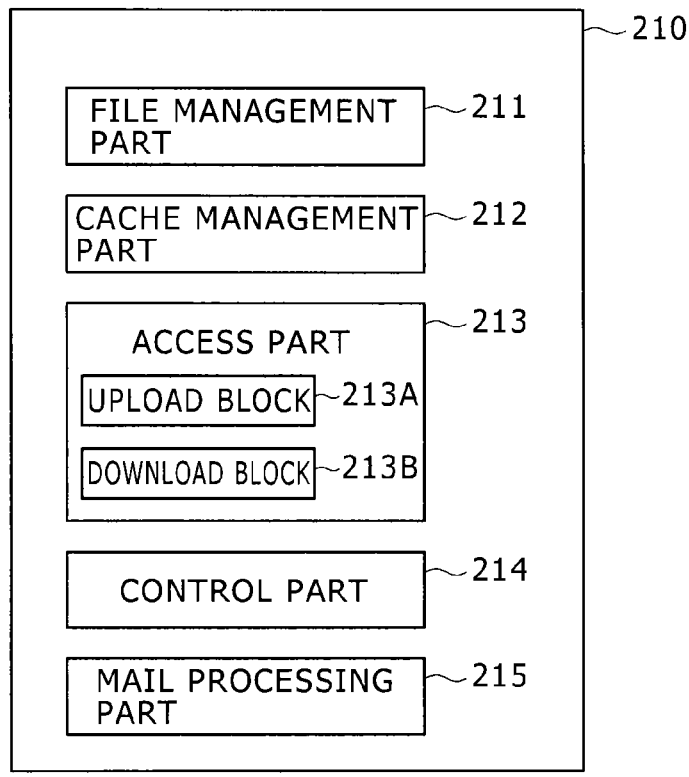
FIG. 3 is a functional block diagram of the NAS according to an aspect of the disclosure.

The operations of the NAS 200 are explained below. FIG. 3 is a functional block diagram of a typical NAS 200.

As shown in FIG. 3, the CPU 210 carries out the control programs held in the memory 220 to implement such functions as a file management part 211, a cache management part 212, an access part 213, a control part 214, and a mail processing part 215.

The file management part 211 carries out the processing of the file system. The file management part 211 performs file management using a directory structure in which virtual local directories representative of the substantive directories in the online storage 300 are provided as part of the directories formed on the HDD 230 of the NAS 200. The organization of such virtual local directories may be implemented using FUSE (Filesystem in Userspace), NFS (Network File System) or the like. By accessing the NAS 200, the user of the PC 100 can view the directory structure including the virtual local directories and can handle files in the directories. A typical directory structure will be discussed later.

The cache management part 212 stores (i.e., caches) into the cache area of the memory 220 the file to be uploaded to the online storage 300 (i.e., storage target file) and the file downloaded from the online storage 300. Also, in response to a file update request from the PC 100, the cache management part 212 updates the file being cached in the cache area (i.e., overwrites the cached file with a new file).

Given a file storage request to store a file into a virtual local directory, the cache management part 212 stores (caches) the storage target file corresponding to the file storage request into the cache area. Furthermore, given a file update request to update the file stored (cached) in the cache area, the cache management part 212 updates the cached file.

The access part 213 calls the API of the online storage 300 and performs an access process including at least either an upload of a file to the online storage 300 or a download of a file from the online storage 300. The access part 213 includes an upload block 213A for making the upload to the online storage 300 and a download block 213B for making the download from the online storage 300. It is assumed that the information necessary for the access part 213 to access the online storage 300 is stored beforehand in the memory 220.

In this example, under instructions from the control part 214, the upload block 213A uploads the file stored (cached) by the cache management part 212 to the online storage 300. Also under instructions from the control part 214, the download block 213B downloads the file corresponding to the file read request in effect from the online storage 300.

The control part 214 counts the number of times access is made (i.e., number of times API is called) per unit time by the access part 213. The unit time is equivalent to the unit time stipulated by the use constraints of the online storage 300. If the use constraints constitute the amount of data communicated per unit time, then the control part 214 need only accumulate the amount of data communicated.

Based on the number of times access is made per unit time, the control part 214 performs access inhibit control to inhibit the access process by the access part 213 so as to meet the use constraints stored in the memory 220. The control part 214 performs access inhibit control if the number of times access is made per unit time by the access part 213 exceeds an access count threshold value. The access count threshold value is set to be lower than the upper limit on the access count per unit time as the use constraints, and is assumed to be stored beforehand in the memory 220.

For example, in carrying out access inhibit control, the control part 214 puts on hold the upload of a target file for a predetermined holding time (time-out time) after the file in question is stored (cached) into the cache area by the cache management part 212, even if the file is being updated. Preferably, the higher the frequency with which the cached file is updated, the longer the time can be in which to put the upload of the file in question on hold. This process will be discussed again later. Also, in performing access inhibit control, the control part 214 may put on hold the download from the online storage 300 and retry the download upon elapse of a predetermined time period.

The mail processing part 215 may detect a failed upload based on a completion code returned from the online storage 300 in response to the upload thereto. Upon detecting an unsuccessful upload to the online storage 300 attempted by the upload block 213A, the mail processing part 215 may send to the PC 100 an e-mail saying that the upload has failed. It is assumed that the e-mail address of the PC 100 is stored beforehand in the memory 220.

Figure 4:
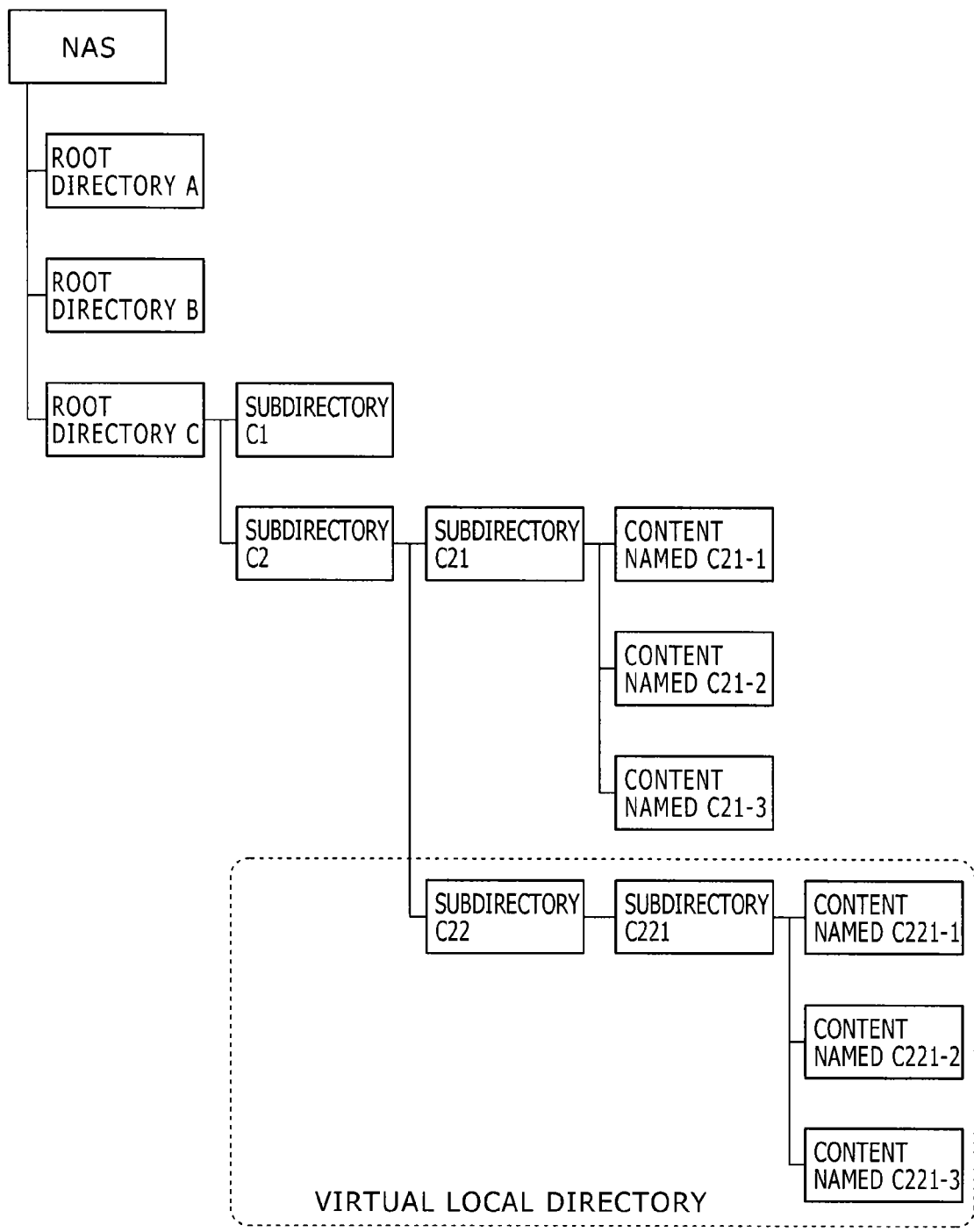
FIG. 4 is a schematic view showing a typical directory structure managed by a file management part according to an aspect of the disclosure.

A specific example of the directory structure managed by the file management part 211 is explained below. FIG. 4 is a schematic view showing a typical directory structure managed by the file management part 211.

As one example, the directory structure shown in FIG. 4 has root directories A through C of which the substance is held on the HDD 230 in the NAS 200. Also, subdirectories C1 and C2 are formed under the root directory C, and subdirectories C21 and C22 are placed subordinate to the subdirectory C2.

The substance of the files included in the subdirectory C21 (contents C21-1 through C21-3) is stored in the NAS 200. By contrast, the substance of the files included in the subdirectory C22 (i.e., a further subdirectory C221; contents C221-1 through C221-3) is stored in the online storage 300.

As described above, although the subdirectory C22 and the directories subordinate to the subdirectory C22 are handled as if the files therein exist in the NAS 200, the substance of these files is in fact stored in the online storage 300. As such, these subdirectories are configured as virtual local directories.

The above-described virtual local directories may be configured using software such as FUSE (Filesystem in Userspace) with which the file system can be organized.

(NAS Operations)

Figure 5:
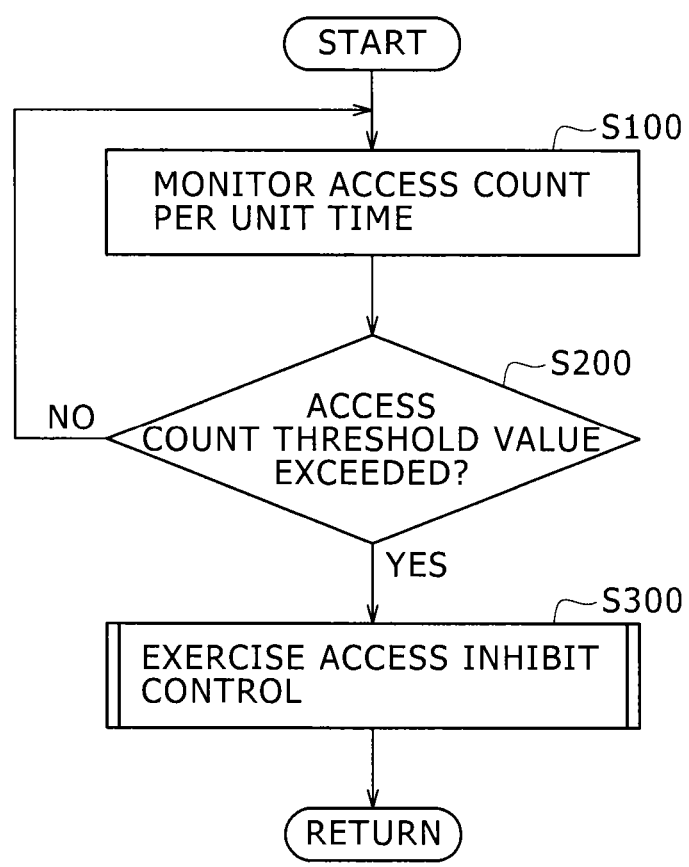
FIG. 5 is a flowchart of operations performed by the NAS according to an aspect of the disclosure.

Explained below are the operations of the NAS 200. FIG. 5 is a flowchart of typical operations performed by the NAS 200.

As shown in FIG. 5, in step S100, the control part 214 monitors (i.e., counts) the number of times access is made (i.e., number of times the API is called) per unit time by the access part 213.

In step S200, the control part 214 determines whether the number of times access is made per unit time by the access part 213 exceeds an access count threshold value. The access count threshold value is set to be lower than the upper limit on the access count per unit time as the use constraints. In the current context, that the number of times access is made per unit time by the access part 213 exceeds the access count threshold value means that the access count of the access part 213 per unit time is approaching the upper limit.

If it is determined that the number of times access is made per unit time by the access part 213 does not exceed the access count threshold value ("NO" in step S200), the control part 214 returns to step S100 and continues its processing. If it is determined that the number of times access is made per unit time by the access part 213 exceeds the access count threshold value ("YES" in step S200), the control part 214 goes to step S300.

If the number of times access is made per unit time by the access part 213 does not exceed the access count threshold value, that means the access count of the access part 213 per unit time still has room to spare before the upper limit is reached. In that case, it is possible to upload the file, for example, every time the file is updated so that the cached file remains identical to the file stored in the online storage 300. The file in question can then be downloaded immediately in response to a file read request.

In step S300, the control part 214 performs access inhibit control. What follows is a detailed explanation of what takes place in step S300.

Figure 6:
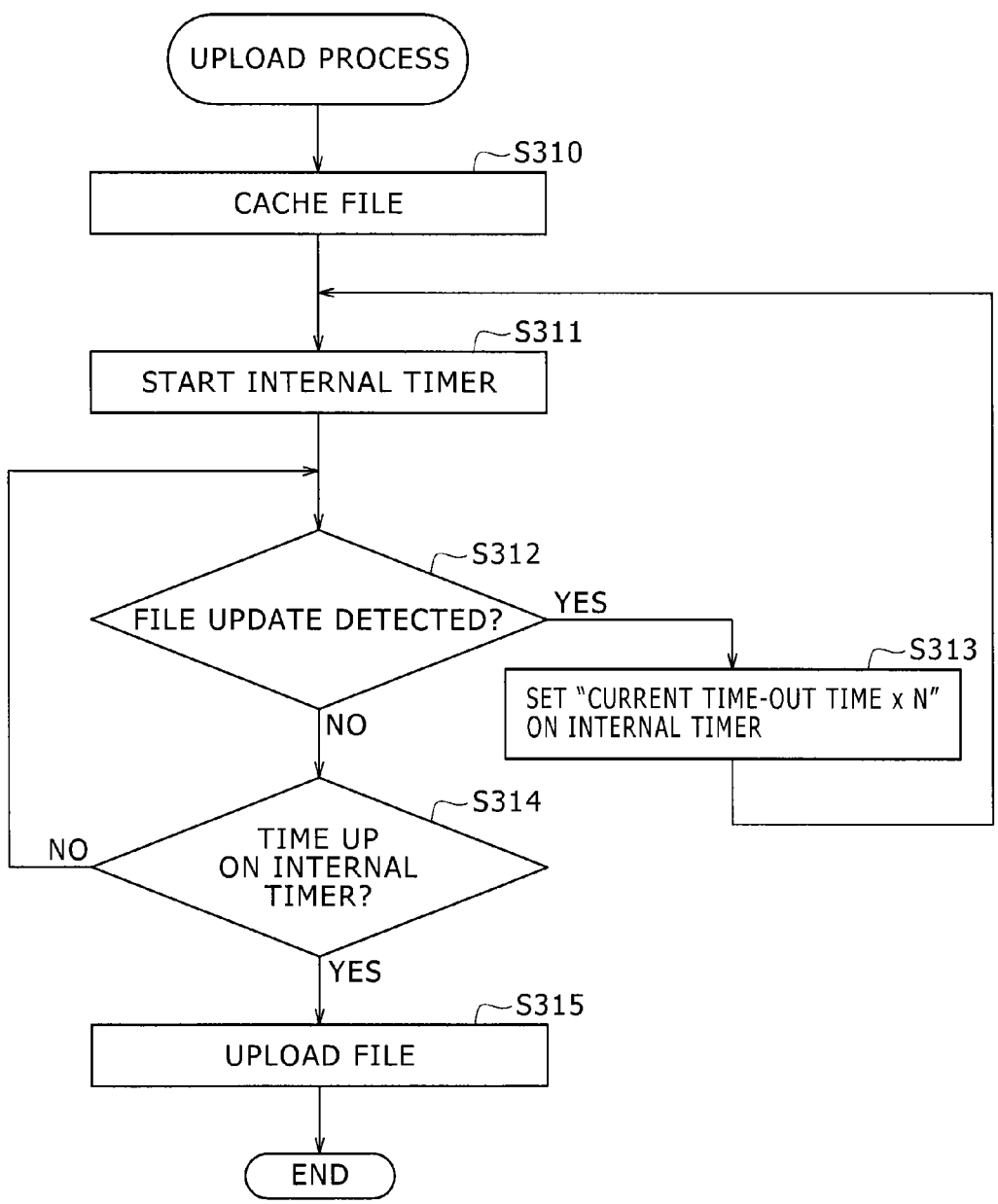
FIG. 6 is a flowchart of an upload process performed in step S300 of FIG. 5 by the NAS according to an aspect of the disclosure.

The upload process performed in step S300 of FIG. 5 is explained below. FIG. 6 is a flowchart of a typical upload process carried out in step S300 of FIG. 5. The upload process in this case is targeted for a virtual local directory.

As shown in FIG. 6, in step S310, the cache management part 212 stores (i.e., caches) a storage target file into the cache area in response to a file storage request to store the target file into a virtual local directory.

In step S311, the control part 214 sets an initial value of the time-out time (e.g., 15 seconds) on an internal timer and starts the internal timer.

In step S312, the control part 214 determines whether there is a file update request to update the file being stored (cached) by the cache management part 212 in the cache area. If it is determined that a file update request is made to update the file stored (cached) in the cache area by the cache management part 212 ("YES" in step S312), the control part 214 goes to step S313. If it is determined that there is no file update request to update the file stored (cached) by the cache management part 212 in the cache area ("NO" in step S312), the control part 214 goes to step S314.

In step S313, the control part 214 resets the internal timer by prolonging the current time-out time. For example, the control part 214 may set the current time-out time multiplied by N (e.g., N=2) on the internal timer. After resetting the internal timer in this manner, the control part 214 returns to step S311 and continues its processing. This starts in step S311 the internal timer on which the prolonged time-out time (e.g., multiplied by N) is being set.

In step S314, the control part 214 determines whether time is up on the internal timer (i.e., whether a time-out has occurred). If it is determined that a time-out has occurred on the internal timer ("YES" in step S314), the control part 214 goes to step S315. On the other hand, if it is determined that a time-out has yet to occur on the internal timer ("NO" in step S314), the control part 214 returns to step S312. In step S312, the control part 214 again determines whether there is a file update request.

In step S315, the control part 214 controls the upload block 213A to upload the file being stored (cached) in the cache area by the cache management part 212.

In this example, the upload of the file is put on hold for at least a predetermined holding time. If an update of the file in question is detected during the holding time, the upload of the file is further postponed. For example, if the initial holding time is assumed to be 15 seconds and if the holding time is doubled every time the file is updated, the upload of the file that is updated once is put on hold for a total of 30 seconds. That is, if the file is updated 10 seconds after the start of the holding time, the upload of the file is put on hold for another 20 seconds starting from the point of the update (for a total holding time of 30 seconds).

If another update of the file put on hold for 30 seconds is detected, the upload of the file in question is placed on hold for a total of 60 seconds. Thus the higher the frequency with which the file is updated, the longer the time can be in which to put the upload of the file in question on hold.

The holding time may be varied by those skilled in the art using other methods. For example, the prolongation of the holding time may be determined based on the remaining holding time. If the prolongation is to be twice the remaining holding time and if an update is made 10 seconds after the start of a 15-second holding time, then the prolongation will be 10 seconds, i.e., twice the remaining 5 seconds so that the file is put on hold for a total of 20 seconds.

If the upload has failed even under the above-described control, then the mail processing part 215 sends out an e-mail saying that the upload is unsuccessful as explained above.

If an instruction is issued to interrupt or terminate the ongoing process shown in FIG. 5, entailing a shutdown of the file management apparatus for example, then the control part 214 goes to step S315 and performs the upload even if a time-out has yet to occur on the internal timer.

Explained below is the download process carried out in step S300 of FIG. 5. FIG. 7 is a flowchart of a typical download process performed in step S300 of FIG. 5. The ensuing paragraphs will discuss the download process targeted for a virtual local directory.

As shown in FIG. 7, in step S320, the file management part 211 receives from the PC 100 a file read request to read a file from the virtual local directory.

In step S321, the control part 214 performs control to interrupt the download of the target file corresponding to the file read request received by the file management part 211.

In step S322, the control part 214 waits for a predetermined holding time to elapse following the interruption of the download of the read target file.

In step S323, upon elapse of the holding time, the control part 214 controls the download block 213B to download the read target file.

As explained above, even where the online storage 300 is subject to the use constraints imposed by the service provider, the NAS 200 stores and retrieves files appropriately. Also, every time the target file is updated, the NAS 200 does not upload the target file immediately but performs access inhibit control to put on hold the upload of the file for a predetermined hold time after the file in question is cached. This arrangement makes it possible to forestall growing traffic load resulting from uploads that handle frequently updated files.

The NAS 200 performs access inhibit control when the number of times access is made per unit time by the access part 213 exceeds the access count threshold value set to be lower than the upper limit stipulated by the use constraints. That means access inhibit control is performed before the access count of the access part 213 per unit time exceeds the upper limit stipulated by the use constraints. This makes it possible to lower the possibility that files cannot be stored or retrieved because access to the online storage 300 becomes unavailable.

The higher the frequency with which the cached file is updated, the longer the time can be in which to put the upload of the file in question on hold. This arrangement prolongs the holding time for frequently updated files, thus effectively reducing the frequency of the upload. The frequently updated files are also uploaded in a suitably timed manner.

In carrying out access inhibit control, the NAS 200 puts on hold the download from the online storage 300 for a predetermined holding time and retries the download upon elapse of the holding time. The download is thus accomplished while the use constraints of the online storage 300 are being met.

In the event of a failure to upload a file to the online storage 300, the NAS 200 notifies the user thereof by sending to the PC 100 an e-mail saying that the upload has failed. Where control is exercised to put the upload on hold as discussed above, there may well be a delay from the time the user performs operations to store the target file until the upload is actually carried out and the user may not notice the failure of the upload. In such a case, an e-mail may be sent to notify the user of the failed upload.

The NAS 200 performs file management using a directory structure in which virtual local directories representative of substantive directories in the online storage 300 are placed subordinate to a directory in the NAS 200. When this type of directory structure is changed as needed, the online storage 300 can be handled as a local storage.

The NAS 200 uploads a file to the online storage 300 based on a file storage request to store the target file into a virtual local directory or on a file update request to update the requested file therein. In this manner, the file to be stored into, or updated in, the virtual local directory is uploaded to the online storage 300 without the user carrying out operations explicitly to make the upload.

Although the description made above in reference to the accompanying drawings contains many specificities, these should not be construed as limiting the scope of the disclosure but as merely providing exemplary illustrations of this disclosure. It is evident that many alternatives, modifications and variations will become apparent to those skilled in the art in light of the foregoing description.

For example, whereas the NAS 200 is regarded as the file management apparatus in the above-described aspect of the present disclosure, the PC 100 may be considered alternatively to be the file management apparatus replacing the NAS 200. In this case, the PC 100 is to have substantially the same hardware configuration shown in FIG. 2 and the same functional structure indicated in FIG. 3, and to carry out the representative steps given in the flowcharts of FIGS. 5 through 7.

Thus the scope of the disclosure should be determined by the appended claims and their legal equivalents, rather than by the examples given.

What is claimed is:

1. A file management apparatus comprising:
a network interface that communicates with an online storage subject to use constraints;
a processor that:
controls at least one of two access processes, a first of said two access processes being an upload to said online storage, a second of said two access processes being a download from said online storage; and
performs access inhibit control to inhibit said access processes to meet said use constraints based on at least one of a number of times access is made to said online storage per unit time and an amount of data communicated with said online storage per unit time.

2. The file management apparatus according to claim 1, wherein
said use constraints include an upper limit on a number of times access is made to said online storage per unit time, and
if a number of times access is made to said online storage per unit time exceeds an access count threshold value set to be lower than said upper limit, then said processor performs said access inhibit control.

3. The file management apparatus according to claim 1, wherein
  said use constraints include an upper limit on an amount of data communicated with said online storage per unit time, and
  if an amount of data communicated with said online storage per unit time exceeds a communication data amount threshold value set to be lower than said upper limit, then said processor performs said access inhibit control.

4. The file management apparatus according to claim 1, wherein
  said processor controls storing a file to be uploaded to said online storage into a cache area, and
  until a predetermined holding time elapses after said file is stored into said cache area, said processor performs said access inhibit control to put on hold upload of said file even if said file is updated.

5. The file management apparatus according to claim 1, wherein
  said processor performs said access inhibit control to retry downloading upon elapse of a predetermined time during which a download from said online storage is put on hold.

6. The file management apparatus according to claim 1, wherein
  said processor performs said at least one of two access processes based on a file handling request transmitted from a user terminal via a network.

7. The file management apparatus according to claim 6, wherein
  if an upload to said online storage fails, said processor controls transmitting an e-mail to said user terminal indicating that said upload has failed.

8. The file management apparatus according to claim 1, wherein
  said processor performs file management using a directory structure in which a virtual local directory representing said online storage is placed subordinate to a directory representing said file management apparatus.

9. The file management apparatus according to claim 8, wherein
  said processor controls uploading a file to said online storage based on either a request to store said file into said virtual local directory or a request to update said file.

\* \* \* \* \*